Figure 1:
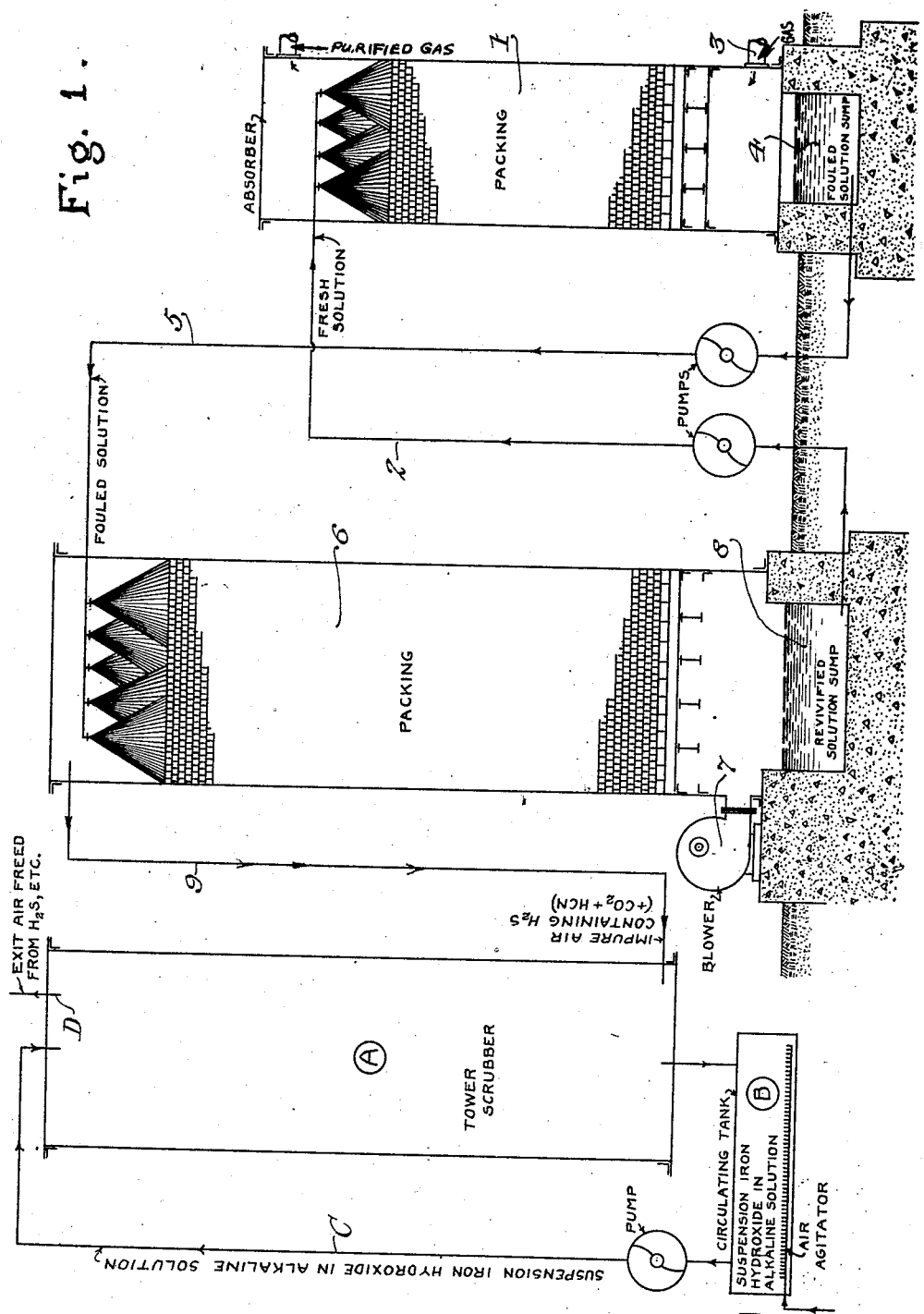

July 28, 1931. F. W. SPERR, JR 1,815,933
PROCESS FOR THE ELIMINATION OF HYDROGEN SULPHIDE IN FUEL GAS
Filed Dec. 12, 1921 2 Sheets-Sheet 2
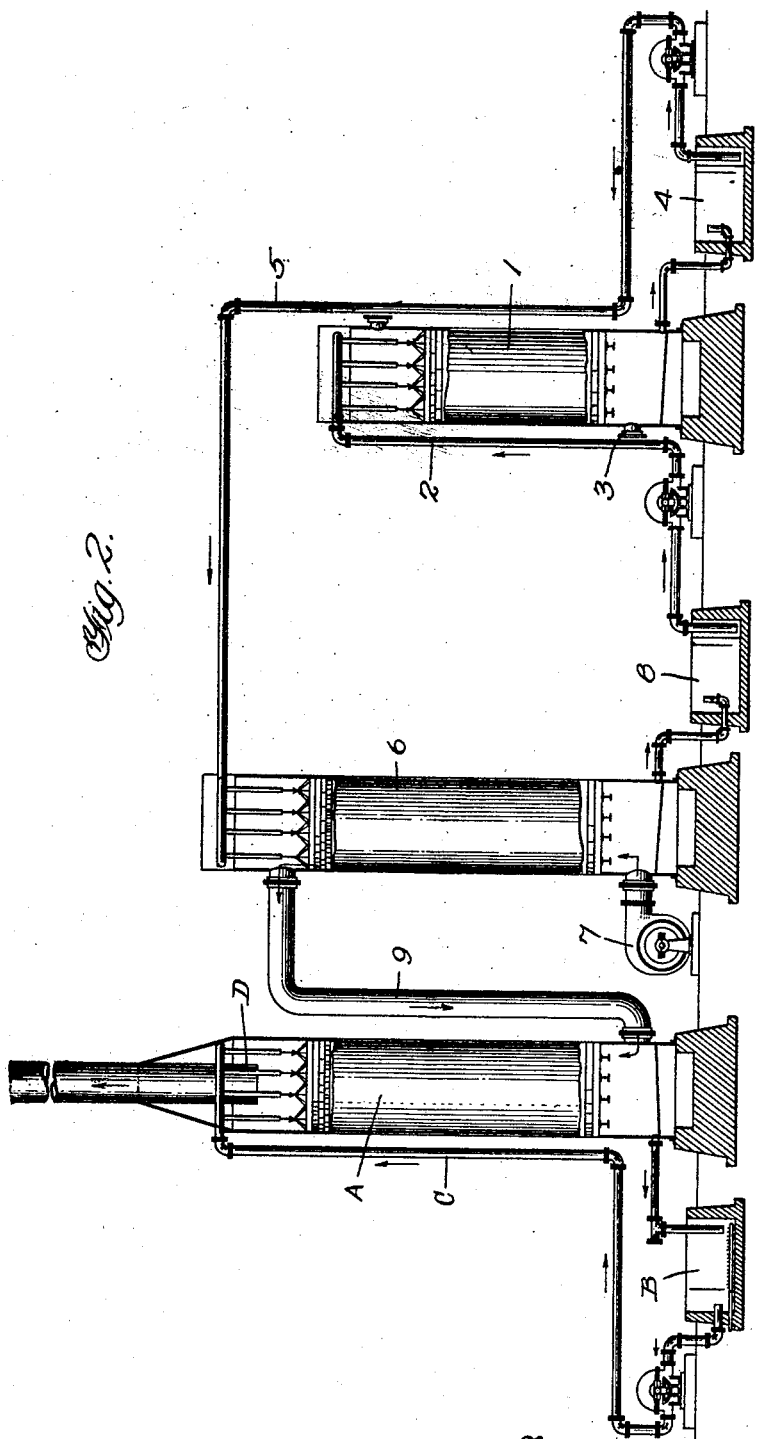
Fig.2.
Inventor
Frederick
W. Sperr, Jr.
By Munday, Clarke & Carpenter
Attorneys Patented July 28, 1931

1,815,933

UNITED STATES PATENT OFFICE

FREDERICK W. SPERR, JR., OF PITTSBURGH, PENNSYLVANIA, ASSIGNOR TO THE KOPPERS COMPANY, OF PITTSBURGH, PENNSYLVANIA, A CORPORATION OF PENNSYLVANIA

PROCESS FOR THE ELIMINATION OF HYDROGEN SULPHIDE IN FUEL GAS

Application filed December 12, 1921. Serial No. 521,913.

This invention relates generally to elimination of hydrogen sulphide in fuel gas such as coal gas and the like, so as to effect the extinction of that noxious constituent of such gas, and do so by a continuous, regenerative, fluid wash method practically and economically operable in the large scale commercial treatment of such gas; and the invention is an important development of the gas purification process operating generally in accordance with the process described and claimed in the prior Letters Patent of the United States of David L. Jacobson, dated September 6, 1921, No. 1,390,037. Broadly stated such gas purification process consists in bringing the gas to be purified into direct contact with an alkaline absorbent agent, such as a solution of sodium carbonate, to absorb the noxious constituents from the gas, and then subjecting the absorbent agent containing the absorbed impurities to aeration to remove the absorbed impurities and to effect a regeneration of the absorbent agent, with the result that the absorbent agent is available for further gas purification. In that stage of the gas purification process in which the regeneration of the fouled absorbent agent is effected, the air removes the hydrogen sulphide from the absorbent agent, and carries the hydrogen sulphide out of the actifier employed for the regeneration stage of the process. By the present invention, the hydrogen sulphide is removed and recovered from the air discharged from the actifier, with the result that such discharged air does not become a source of nuisance in the vicinity of the gas purification plant. As an incidental by-product, some free sulphur is recovered.

In addition to the general objects recited above, the invention has for further objects such other improvements or advantages in operation and results as are found to obtain in the process, structures and devices hereinafter described or claimed.

In the accompanying drawings forming a part of this specification and showing, for purposes of exemplification, a preferred form and manner in which the invention may be embodied and practiced, but without limiting the claimed invention to such illustrative instance:

Fig. 1 shows a partly diagrammatic representation of apparatus for carrying out the improved process of the invention, in conjunction with a gas purification process such as that described in the before mentioned patent to David L. Jacobson. Fig. 2 is an elevational view of the same apparatus shown more diagrammatically in Fig. 1.

In its present embodiment, the invention is applied to the removal of hydrogen sulphide from the mixtures of air and hydrogen sulphide discharged from the actifier of a gas purification process. For convenience, the present description will be confined to this use of the invention. Features of the invention are, however, capable of other valuable applications, consequently, the invention is not limited in its scope to the specific use and embodiment herein described as an illustrative example.

According to the Jacobson gas purification process, there is employed a water solution of an alkaline compound, such as sodium carbonate, for effecting the absorption of the hydrogen sulphide and other impurities from the gas. The gas to be purified enters the bottom of the absorber 1 at 3 and passing upwardly through said absorber is brought into contact with the sodium carbonate solution which is supplied to the top of the absorber from the fresh solution line 2. The purified gas passes out of the top of the absorber, and the solution containing the absorbed impurities discharges from the bottom of the absorber into a sump 4. From the sump 4, the fouled solution is pumped through a line 5 and discharged into the top of the actifier 6. In the actifier 6, the solution meets an upward current of air supplied by the blower 7 at the bottom, and the air removes the sulphur and other impurities from the solution thereby revivifying or regenerating the solution for further gas purification. The regenerated solution discharges into a well or sump 8 at the bottom of the actifier, from which the rejuvenated solution may be pumped back through the line 2 to the absorber.

The air containing hydrogen sulphide passes out of the top of the actifier through the line 9. Besides hydrogen sulphide, the air may contain carbon dioxide and hydrogen cyanide. According to the invention, the air laden with hydrogen sulphide and other noxious constituents is brought into intimate contact with a washing mixture, consisting of a suspension of iron oxide in an alkaline solution. Various iron compounds may be used for the purpose, as stated later, but reference is made to iron oxide only in the present exemplification. The process is carried out in a tower filled with suitable packing or any other suitable type of washer. The mixture of iron oxide and dissolved alkali absorbs the hydrogen sulphide from the air, while simultaneously an oxidation of the absorbed sulphide to free sulphur takes place by means of the air present; the result of the whole action may be summarized as a conversion of hydrogen sulphide to free sulphur, the iron oxide and dissolved alkali acting as intermediate agents to hasten the reaction.

In both Fig. 1 and Fig. 2 of the drawings it may be noted that there is a relatively large air blower (7), and that while the actifier (6) and air-scrubber (A), through which the same air current passes, are towers of about equal size, each of those towers is much larger than the absorber tower (1) through which the fuel gas being treated flows; and the fact that there is thus preferably provided a volume of air even greater than the fuel gas volume from which the hydrogen sulphide is originally taken means that the proportion of hydrogen sulphide carried by that air is as slight as the hydrogen sulphide in the fuel gas, so that there is an enormous overplus of oxygen in the air-scrubber in excess of the quantum whose reaction frees the sulphur from the wash-liquor as the wash-liquor eliminates the hydrogen sulphide from the flowing air. Such a great overplus of oxygen renders practical such continuous regeneration of the wash-liquor that there may be effective elimination of the elusively slight amount of hydrogen sulphide carried by the large air current and so there is immediate provision for purification of the great air volume required to aerate the fouled absorbent solution flowing from the absorber in which the fuel gas is purified.

As shown in the drawings, the suspension of iron oxide in the alkaline solution is stored in a circulating tank B. Here an air agitator or other means of agitation is provided. The reactions may take place partly in this tank. The suspension is pumped through the line C into the top of the tower A where it meets the air laden with hydrogen sulphide; such mixture of air and hydrogen sulphide being conveyed to the bottom of the tower A through the line 9. For practical purposes, it is not necessary that the whole content of the hydrogen sulphide be removed from the air, it being unobjectionable to leave small traces of hydrogen sulphide in the air in most cases. However, where it is so desired, even the last traces of hydrogen sulphide can be removed by using the proper concentration of alkali and proper amount of iron oxide in suspension, combined with proper regulation of the rate of flow of the air. The concentration of dissolved alkali and of suspended iron hydroxide may be varied as desired; in practice a 2 to 3 percent suspension of iron oxide in a ½ to 1 percent solution of sodium carbonate will be found satisfactory. The exit air leaves the washer or tower through the line D freed of most or all of its hydrogen sulphide and other noxious constitutents, and it is no longer the possible source of nuisance it might be before this treatment. At the same time, free sulphur is recovered, as a by-product of some value. The whole process may be made continuous as shown in the attached diagram of the apparatus. In the continuous process, the solution containing the suspension is discharged from the tower into the tank B for further delivery through the line C to the tower.

The chemical reactions may be exemplified by the following equations:

Absorption of hydrogen sulphide by sodium carbonate forming sodium sulphide:

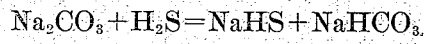

Carbon dioxide and hydrogen cyanide if present are also absorbed:

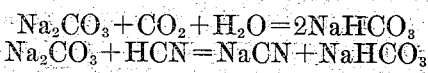

Interaction of sodium hydrogen sulphide and sodium bicarbonate with iron oxide forming iron sulphide and regenerating the alkali:

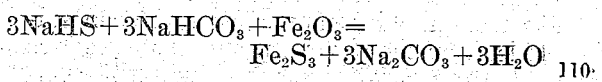

Action of air on iron sulphide regenerating the iron oxide and producing free sulphur:

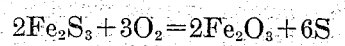

All these reactions may be combined and summarized as a conversion of hydrogen sulphide to free sulphur

In addition to these reactions, part of the sodium hydrogen sulphide may react with the air and free sulphur present resulting in the formation of sodium thiosulphate. This salt may be allowed to accumulate and can be recovered by a suitable process, such as that described in the co-pending application for Letters Patent of the United States of Ralph E. Hall and David L. Jacobson, filed April 18, 1921, Serial No. 462,136.

The free sulphur is allowed to accumulate in the suspension. From time to time part of the sludges may be withdrawn for the recovery of sulphur and iron oxide; and fresh iron oxide and dissolved alkali are added to maintain the concentration. Instead of iron oxide, iron sulphide may be added to the circulating tank, where the air will convert it to iron oxide. Such conversion within the circulation system introduces the iron oxide in a fresh or nascent state in which it is peculiarly active and effective in its reaction with hydrogen sulphide. The aeration accomplished by the air agitator within the circulating tank B is particularly effective in promoting reactions there and also in causing flotation of the freed sulphur to facilitate skimming it from the liquor in the tank.

The process is carried out as mentioned above by means of a suspension of iron oxide in an alkaline solution. This washing mixture may be obtained by means of a number of materials which have essentially the same effect in carrying out the reactions described. Instead of iron oxide, ferric carbonate or basic ferric carbonate may be employed; or the iron may be in the form of ferric hydroxide or ferric oxide. Ferrous compounds may also be employed instead of the iron oxide, either in the form of ferrous oxide, ferrous carbonate or ferrous hydroxide; the ferrous compounds will have an action similar to the ferric oxide, and at the same time the aerating process will gradually transform them to the ferric state. The dissolved alkali may be any substance which gives an alkaline reaction to the solution, such as the carbonates of sodium and potassium, or the hydroxides of sodium and potassium; or else alkaline magnesium or calcium compounds, such as magnesium hydroxide or magnesium carbonate may be added to the suspension, which has the same effect of rendering the solution alkaline.

In another modification of the same process, iron oxide is used in a water suspension, instead of an alkaline solution. The whole process is carried out as before. The efficiency of removal of hydrogen sulphide is somewhat lower but on the other hand no alkali is used up and no thiosulphate forms, so the process is economical in this respect. Enough hydrogen sulphide is removed from the air so that it is unobjectionably and easily disposed of, while free sulphur is recovered as a valuable product. A 2% to 3% suspension of iron oxide in water will be found satisfactory. The chemical reactions include absorption of the hydrogen sulphide by iron oxide forming iron sulphide, and a simultaneous oxidation of iron sulphide to free sulphur by the air present, with regeneration of the iron oxide. The whole reaction may be summarized as a conversion of the hydrogen sulphide by the air present to free sulphur, the iron oxide acting as an intermediate agent to hasten the action. For example:

$$6H_2S + 3O_2 = 6H_2O + 6S$$

The invention, as hereinabove set forth may be variously embodied within the scope of the claims hereinafter made.

I claim:

1. In a process for removing hydrogen sulphide from coal or water gases by treating the gases with an alkali carbonate solution to absorb the hydrogen sulphide, then activating the solution containing the hydrogen sulphide by passing the foul solution counter to a flow of air, the improvement which consists in removing the hydrogen sulphide from the air by passing the air through a body of iron oxide moving in the opposite direction.

2. In a process for removing hydrogen sulphide from coal or water gases by treating the gases with an alkali carbonate solution to absorb the hydrogen sulphide, then activating the solution containing the hydrogen sulphide by passing the foul solution counter to a flow of air, the improvement which consists in removing hydrogen sulphide from the foul air by passing the air into a vessel and passing it upwardly counter to a flow of iron oxide passing continuously downwardly, and discharging purified air at the top of the column of iron oxide, whereby the air containing the greatest amount of hydrogen sulphide comes in contact with the partially fouled oxide, and the relatively pure air comes in contact with the fresh oxide.

In testimony whereof I have hereunto set my hand.

FREDERICK W. SPERR, Jr.